J. G. WETMORE.
PIN-BOOK.
No. 172,225. Patented Jan. 11, 1876.
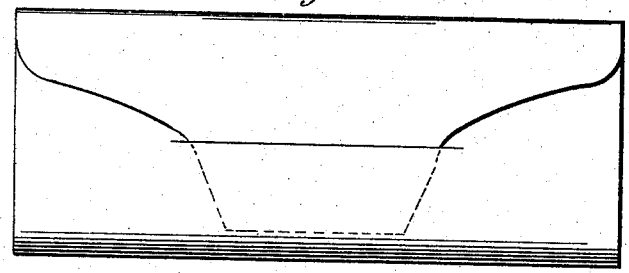
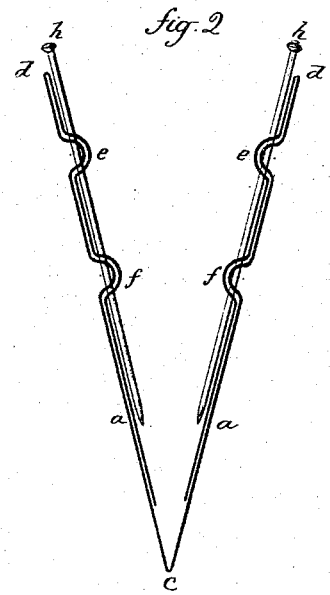
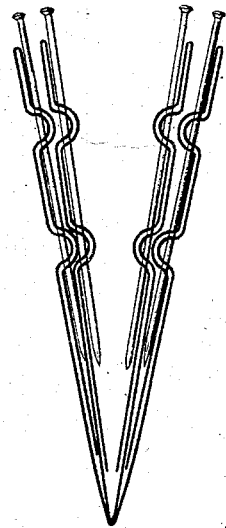
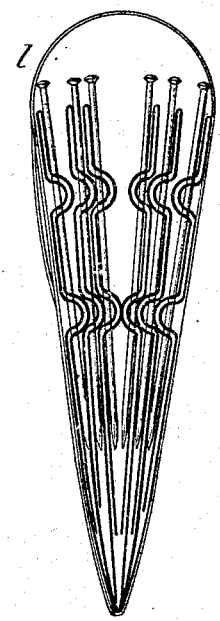

UNITED STATES PATENT OFFICE.

JOHN G. WETMORE, OF WINSTED, CONNECTICUT.

IMPROVEMENT IN PIN-BOOKS.

Specification forming part of Letters Patent No. 172,225, dated January 11, 1876; application filed December 21, 1875.

*To all whom it may concern:*

Be it known that I, JOHN G. WETMORE, of Winsted, in the county of Litchfield and State of Connecticut, have invented a new Improvement in Pin-Books; and I do hereby declare the following, when taken in connection with the accompanying drawings and the letters of reference marked thereon, to be a full, clear, and exact description of the same, and which said drawings constitute part of this specification, and represent in—

Figure 1, front view; Fig. 2, end view, one section detached; Fig. 3, end view of several sections combined; Fig. 4, transverse central section of the book.

This invention relates to an improvement in papering pins, commonly called "pin-books"—that is to say, a book, which, when open, exposes the heads of all the pins without unfolding the paper, as is necessary in the usual method of papering pins; and it consists in leaves of double folds, each double leaf crimped below its edge, so that the pins pass through both folds or thicknesses of the paper, and several of these leaves set one within another, and all secured with an inclosing-cover, as shown, and hereinafter described.

The leaves are made in pairs, *a a*, Fig. 2, representing one such pair of leaves. The paper from which these leaves are formed is doubled at *c*, and then doubled again at *d* to form two edges, the doubling at those points being on to either one side or the other of the leaves *a*, thus forming the leaves of double thickness, and presenting a doubled edge at *d*. At a little distance below the doubled edge *d* the paper is crimped, as at *e*, and again farther down, as at *f*, forming parallel crimps, substantially like the crimps in the common method of papering pins, these crimps being made in both thicknesses of paper, and so that the pins *h*, when stuck, pass through both thicknesses of the leaves at the crimps, as clearly seen in Fig. 2. Several such pairs of leaves are set one within the other, as denoted in Fig. 3, and secured by gluing or stitching, and inclosed within a cover, *l*, which cover is made from paper or fabric, so as to completely surround the package, and inclose the edges of the leaves, so that there is no liability of the pins being accidentally withdrawn from the leaves. By thus doubling the leaves the crimps are made very much stronger than a single crimp, and by folding to make the leaves in pairs there is very much less liability of accidentally separating the leaves than when they are made single.

I am aware that pin-books constructed with leaves and pins stuck thereon, so that all the heads are presented on the opening of the book, are not new. I therefore do not wish to be understood as broadly claiming such an article; but What I do claim as my invention, and desire to secure by Letters Patent, is—

The herein-described pin-book, consisting of the leaves formed in pairs by folding, as at *c*, and each leaf doubled, and the crimps *e f*, formed in the double paper below the doubled edge *d* of the leaf, and the pins passed through both thicknesses of the leaf, at the crimps *e f*, and inclosed with the cover *l*, substantially as specified.

JOHN G. WETMORE.

Witnesses:
JAY E. SPAULDING,
AUGUSTUS U. FENN.